US006426869B1

(12) United States Patent
White

(10) Patent No.: US 6,426,869 B1
(45) Date of Patent: *Jul. 30, 2002

(54) PORTABLE MOTOR VEHICLE WORK STATION

(76) Inventor: Gerald White, 4839 E. Greenway, PMB # 124, Scottsdale, AZ (US) 85254

( * ) Notice: Subject to any disclaimer, the term of this patent is extended or adjusted under 35 U.S.C. 154(b) by 0 days.

This patent is subject to a terminal disclaimer.

(21) Appl. No.: 09/427,567

(22) Filed: Oct. 26, 1999

Related U.S. Application Data

(63) Continuation-in-part of application No. 08/861,722, filed on May 21, 1997, now Pat. No. 5,973,917.

(51) Int. Cl.[7] .............................. G06F 1/16; H05K 5/02
(52) U.S. Cl. ....................... 361/683; 108/44; 224/929; 312/223.3
(58) Field of Search ............................ 361/683; 108/44, 108/45, 42; 312/223.3, 235.1, 183; 224/275, 929

(56) References Cited

U.S. PATENT DOCUMENTS

| | | | | | |
|---|---|---|---|---|---|
| 5,485,793 A | * | 1/1996 | Crowell | ...................... | 108/44 |
| 5,973,917 A | * | 10/1999 | White | ........................ | 361/683 |
| 6,015,198 A | * | 1/2000 | Stair | ...................... | 312/235.1 |

* cited by examiner

Primary Examiner—Lynn D. Feild
(74) Attorney, Agent, or Firm—Ellis, Venable & Busam

(57) ABSTRACT

The present invention is a portable work station which is designed to be used in motor vehicles. The work station is a cabinet which is capable of being secured to a passenger seat of the motor vehicle, preferably by an attached securing means. There is provided a computer tray which is adapted to be releasable attachable to the work surface of the work station and capable of being received within the interior of the work station. An alternate embodiment of the present invention provides a computer tray which is attached to an articulated cantilever system which, when the lid to the main compartment is opened, projects and presents the computer tray and any computer which is secured thereon.

3 Claims, 9 Drawing Sheets

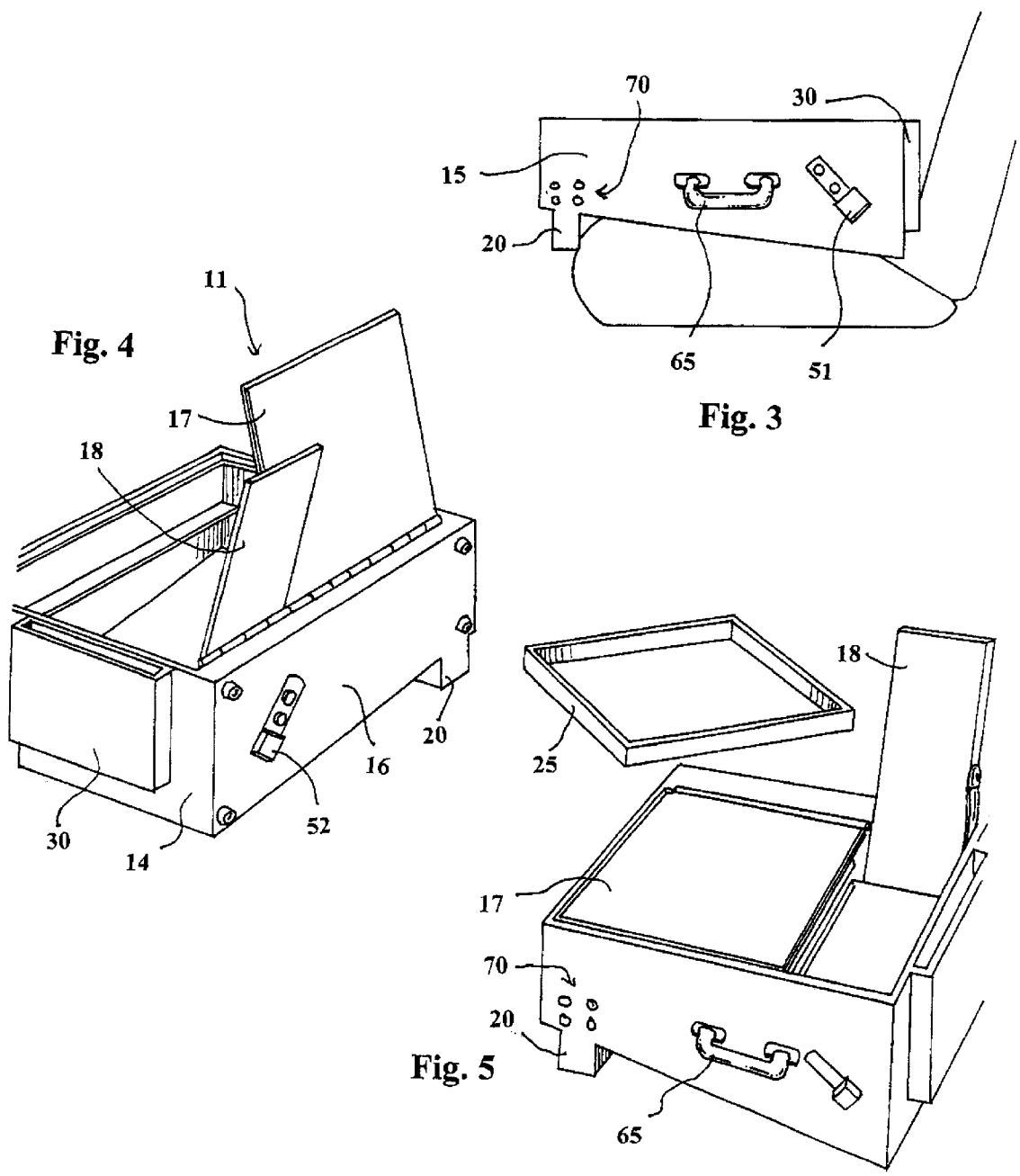

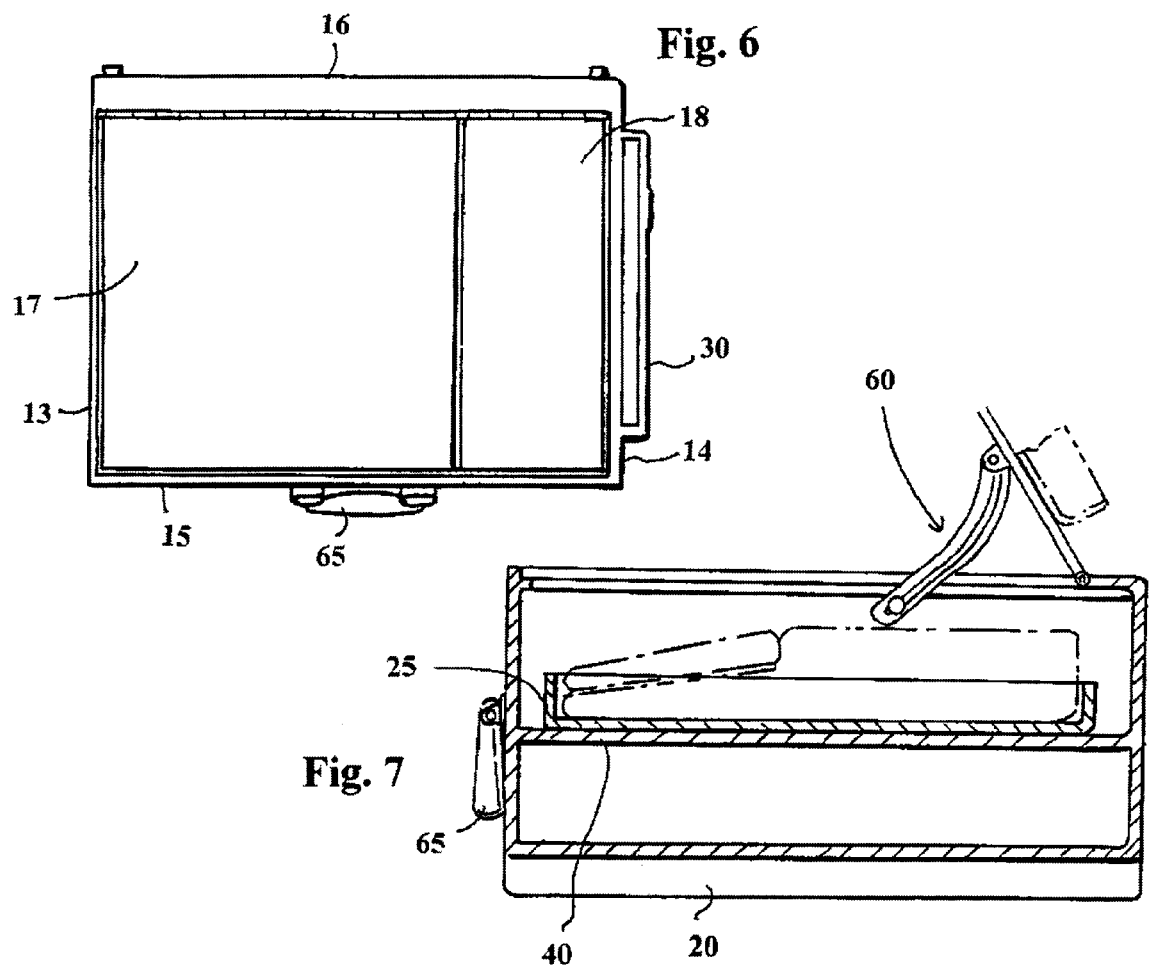
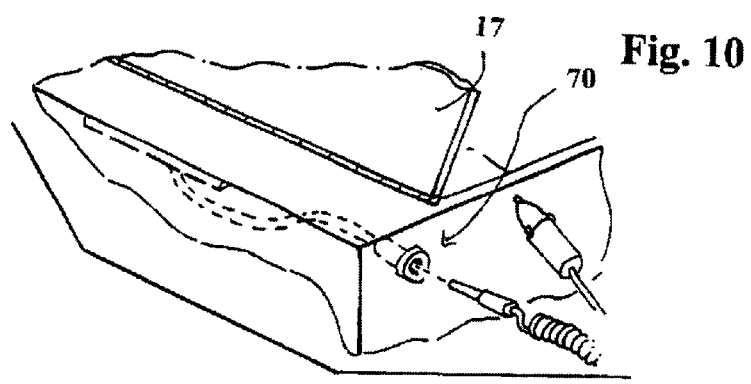

PORTABLE MOTOR VEHICLE WORK STATION

This application is a continuation-in-part of application Ser. No. 08/861,722 filed May 21, 1997, now U.S. Pat. No. 5,973,917.

FIELD OF THE INVENTION

The present invention relates to the field of portable motor vehicle work stations. More specifically, the present invention relates to a portable motor vehicle work station which accommodates either a laptop computer.

BACKGROUND

A large segment of the commercial workforce, especially individuals working in sales and product delivery, use their motor vehicle as a mobile office. During the course of the business day, these individuals must access files, write memoranda, print invoices or the like. When conducted within the confines of a motor vehicle, such business activities are awkward, inconvenient and vexatious.

Conventional clipboards or the like are difficult to use in a motor vehicle since they are unsupported and frequently require one hand to support the clipboard while writing. Moreover, client files and other information, which need to be readily available, are kept in a brief case or transportable file box. Unless these storage devices are immediately adjacent the drivers compartment, they are extremely difficult to access. Furthermore, these storage devices are difficult and inconvenient to transport due to their size and weight.

The recent advent of lightweight portable computers, e.g., laptop and notebook computers has alleviated many of these problems. While currently available portable computers provide the functional capabilities needed for writing and file information access, they are difficult to use in a motor vehicle. An individual using a portable computer in a motor vehicle must balance the computer on their laps or on an adjacent seat. This is awkward and becomes increasingly so if the computer is attached to additional peripheral equipment, such as a printer, a cellular modem, a 12 volt DC power converter or the like.

It is evident that there is a need for an apparatus which decreases the difficulty surrounding the use of portable computers within a motor vehicle. Furthermore, there is a need for an apparatus which provides a desk-like working surface which is adapted to hold a portable computer.

Study of the prior art reveals that there are a variety of devices which attempt to address this and other problems. These devices appear to fall within two major categories. First, devices which affix the portable computer to the motor vehicle, and second, devices which may be strapped onto an adjacent seat and which hold the portable computer.

Example devices found in the first category are U.S. Pat. No. 4,854,538 to Von Schalscha which discloses an computer mounting device for a motor vehicle. The Von Schalscha device has a vehicle mounted base which supports a series of articulated arm members ultimately terminating in a pivotally mounted tray which is capable of holding a portable computer. U.S. Pat. No. 5,564,668 to Crowe discloses a computer mounting device which is similar to the Schalscha device. The Crowe device has a vehicle mounting base with pivotally mounted support arm that ultimately terminates in a pivotally mounted tray capable of holding a portable computer. A final example is U.S. Pat. No. 5,555,491 to Tao which discloses a docking station for a laptop computer which mounts on either a vehicle console or an adjustable pedestal structure with ball and socket joints.

While the above devices suitably hold portable computers in a motor vehicle, they are designed solely for the purpose of holding an appliance such as a portable computer. The above devices have no provisions to hold other frequently used objects, nor do they have the ability to store hard copy files. Moreover, the computer trays of the above devices are not adapted for other uses, such as to provide a firm stable working surface.

The following are example devices found in the second category. U.S. Pat. No. 5,177,665 to Frank et al. discloses an interesting computer support device for use in a motor vehicle. The Frank device has an upper lid which is pivotally attached to a lower support to form an L-shape in the open position. The lower support holds the portable computer while the upper lid releasably mounts the portable computer onto the motor vehicle steering wheel. The Frank device, while suitable for mounting a personal computer to a motor vehicle steering wheel, must be removed during operating the vehicle.

U.S. Pat. No. 4,946,120 to Hatcher discloses a support for a portable computer which is secured onto a motor vehicle passenger seat. The support has a lower unit with adjustable legs and an upper unit which is pivotally mounted to the lower unit. A Nylon strap is provided in the lower unit to secure the entire device to a car seat and a second Nylon strap is provided for securing the computer to the upper unit. The computer tray of the Hatcher device is specifically designed to surround and hold a portable computer, and, due to provided upwardly extending legs, does not provide a convenient working surface with the computer removed.

U.S. Pat. No. 5,092,507 to Szablak et al. discloses a modular workstation which is capably of being secured to a motor vehicle passenger seat. The Szablak device is a modular unit which serves as both a writing surface which has an integrally attached secondary storage unit. Szablak further provides for an additional, detachable storage unit. For a work surface, the Szablak device provides a clipboard assembly which is pivotally mounted onto the work surface to secure loose papers and the like.

U.S. Pat. No. 5,551,616 to Stitt et al. discloses a general purpose organizing container (including laptop computers, cellular phones, food, etc.) that secures to a motor vehicle passenger seat by either a strap which doubles as a transport means for the container or the motor vehicle seat belt. The Stitt device provides a recessed upper work surface which is capable of holding a portable computer.

U.S. Pat. No. 5,560,676 to Griffith et al. discloses a passenger seat mounted vehicle desk. The Griffith desk is secured to the passenger seat by the seat belt and has a flat sliding work surface that is capable of supporting a portable computer. Furthermore, the Griffith device has variety of accessory receptacles and the like.

Thus, it is evident that there is a continuing need for improvements in the field. More specifically, there is a continuing need for a motor vehicle work station that is capable of holding and storing business paraphernalia and is further capable of holding a portable computer. There is also a further need for a device in which a portable computer may be freely repositioned on the work surface to provide maximum comfort and ease of use.

SUMMARY OF THE INVENTION

It is an object of the present invention to provide a portable work station for use in motor vehicles.

It is a further object of the present invention to provide a portable work station which is secured to a passenger seat in a motor vehicle and which provides a surface on which an individual may write or work with a portable computer.

It is another object of the present invention to provide a portable work station which when secured to a passenger seat of a motor vehicle provides a substantially level work surface, this being accomplished by providing a bottom side that is in an angular relationship with the top surface and a leveling means located near a front edge of the bottom side.

It is a still further object of the present invention to provide a portable motor vehicle work station which is secured to the motor vehicle passenger seat by a securing means, one embodiment of said securing means comprising a pair of male/female buckles in which a female portion of the male/female buckles is attached to the right side and left side of the portable motor vehicle work station, respectively. Said pair of male/female buckles being coupled together by an adjustable securing strap.

It is still another object of the present invention to provide a portable work station which is a cabinet which defines an enclosed volume and in which a top work surface is pivotally attached to the cabinet to provide access to the enclosed interior volume.

It is yet a further object of the present invention to provide a portable work station for use in a motor vehicle in which a top pivotally attached work surface is bifurcated into two independent lids, each of which is capable of providing access to an enclosed interior volume of the portable work station.

It is yet another object of the present invention to provide a motor vehicle portable work station which is comprised of a cabinet with a bifurcated, pivotally hinged work surface, said cabinet defining an enclosed volume, and where the enclosed volume is separated into two different compartments, a front compartment and a back compartment, by a substantially vertical partition which extends from a right side to a left side of the cabinet.

It is still yet a further object of the present invention to provide a portable work station cabinet which defines an enclosed volume which is separated into four different compartments, an upper front compartment, a lower front compartment, an upper back compartment and a lower back compartment. The enclosed volume being separated into the four different compartments by a substantially vertical partition which creates the front and back separation, and a first and second substantially horizontal edging, each of which runs along vertical surfaces of the front compartment and the back compartment, respectively, thus creating the upper and lower separation. The first and second edging further defining first and second access apertures through which the lower front compartment and the lower back compartment are accessible.

It is still yet another object of the present invention to provide a portable work station which as a releasably attachable computer tray which has a bottom and four attached sides, the four attached sides being adapted to hold a portable computer. The computer tray further being able to be freely repositioned on the work surface of the work station and also adapted to be received within the upper front compartment of the work station for storage, with or without a held computer. Additionally, the work station having a second accessory tray which is adapted to be freely positionable and releasably attachable to the work station and adapted to be received within the upper back compartment of the work station.

It is still yet a further object of the present invention to provide a portable work station which has a main compartment with a computer tray that is received therein. The computer tray is movingly affixed to the interior of the main compartment by an articulated cantilever arm system which, when the lid to the main compartment is opened, presents and projects the computer tray and any computer secured thereon.

The foregoing and other objectives will become more apparent after consideration of the following detailed description taken, in conjunction with the accompanying drawings, in which a preferred form of this invention is illustrated.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

FIG. 3 is a side view of the present invention illustrating its placement on a motor vehicle seat;

FIG. 4 is a perspective view illustrating the two separate storage compartment lids of the present invention;

FIG. 5 illustrates one form of attachment means for the adjustable computer tray and other devices;

FIG. 6 is a top view of the present invention;

FIG. 7 is a sectional view of the present invention along line 6a—6a;

FIG. 10 illustrates the electrical connection ports for of the present invention.

DESCRIPTION OF PREFERRED EMBODIMENTS

Figure 1:
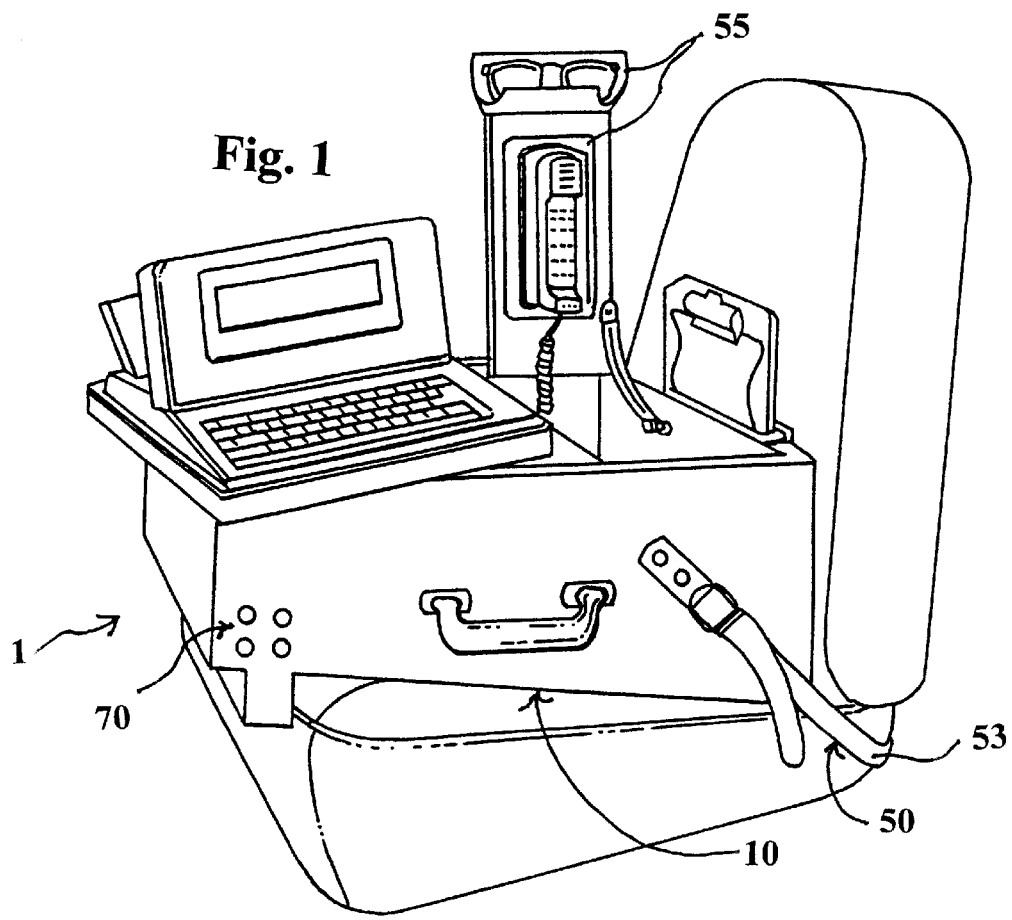
FIG. 1 illustrates the present invention in a use configuration.
Figure 2:
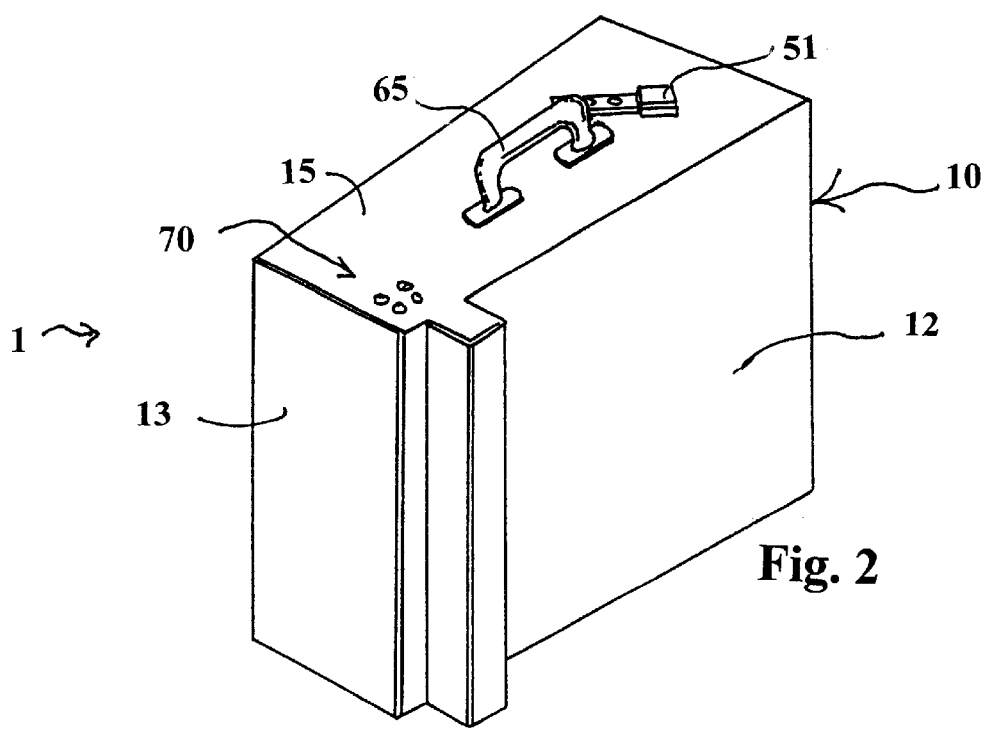
FIG. 2 is a perspective view of the present invention in a travel configuration.
Figure 8:
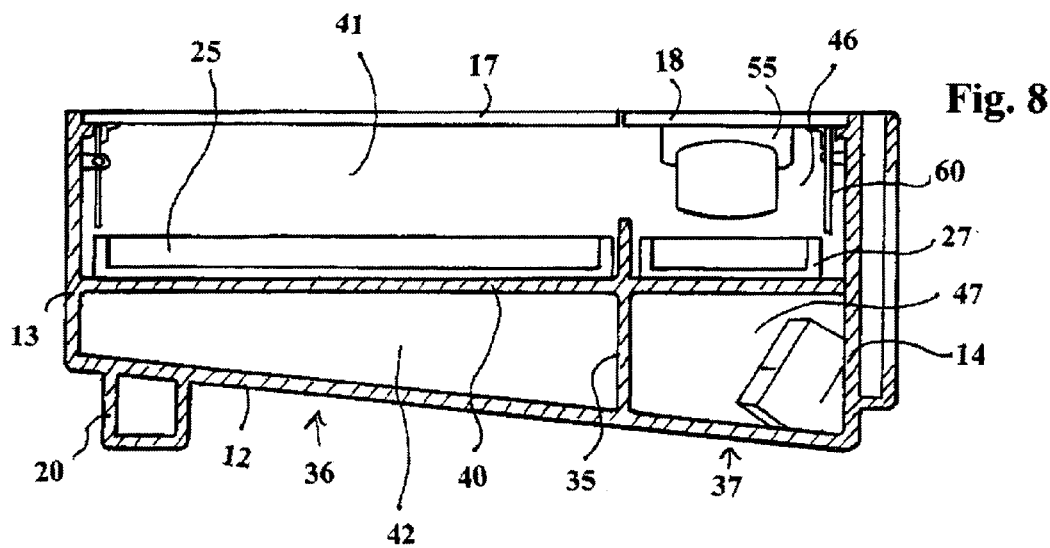
FIG. 8 is a sectional view of the present invention along line 6b—6b.
Figure 9:
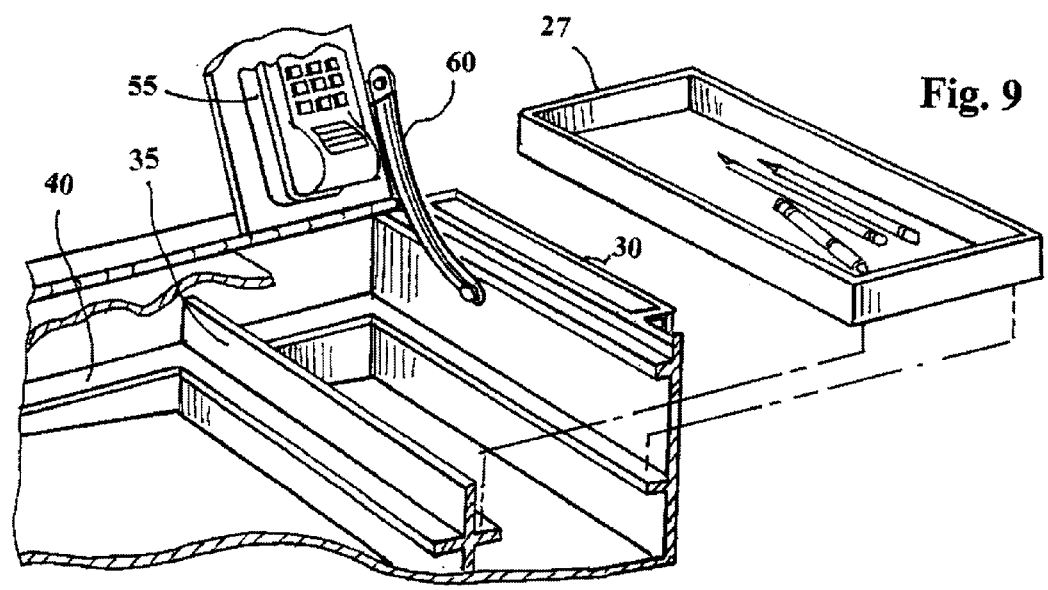
FIG. 9 illustrates the removable accessory tray of the present invention.

The present invention is a work station 1 for use in a motor vehicle. The work station 1 is securable onto a passenger seat 2 of a motor vehicle and is used to provide a convenient and accessible working surface for individuals who conduct business in the motor vehicle. Furthermore, the work station 1 is adapted to organize a variety of business accouterments used and found in a mobile office.

For convenience, the terms "front", "back", "front", "back", "left" and "right" as they relate to the present invention are used merely for descriptive convenience and are specifically not intended to be limitative. These terms, as they relate to the present invention, refer to the present invention as it is installed in a passenger seat of a motor vehicle. Thus, the front of the present invention is towards the front of the vehicle, and the back of the present invention is towards the back of the vehicle. The left side is towards the drivers side of the motor vehicle, and the right side is towards the passenger side of the motor vehicle.

The work station 1 of the present invention is a cabinet 10 with a top or work surface 11 and has an internal storage volume. In the preferred embodiment, the cabinet 10 also has a bottom 12, a front 13, a back 14, a left side 15 and a right side 16, all of which defines the internal storage volume. While the cabinet 10 may have any suitable form, preferably, the front 13, back 14 and left and right sides, 15 and 16, are substantially vertical when the cabinet 10 is strapped into the seat 2 of the motor vehicle and the bottom 12 is canted relative to the work surface, 11, to follow the include usually found in a motor vehicle seat 2. The front 13 is attached to front edges of the bottom 12, the left side 15 and right sides 16. The back 14 is attached to back edges of the bottom 12, the left side 15 and right side 16. The left side 15 is attached to left edges of the bottom 12, the front 13, and the back 14. The right side 16 is attached to right edges of the bottom 12, the front 13 and the back 14.

The work surface 11 of the present invention is bifurcated and is a first lid section 17 and a second lid section 18, both being pivotally attached to a top edge of the right side 16. The lid sections 17 and 18 are adapted to provide a flat surface upon which to work and to allow access to the interior of the cabinet 10. Furthermore, each of the first and second lid sections, 17 and 18 have a support arm 60 which is pivotally attached to the cabinet and attached to the lid section by a post and channel structure, wherein the channel has an indentation which is adapted to received the post and when received will keep the lid section open.

There should be at least one leveling means 20 are attached to the bottom 12. The at least one leveling means 20 is adapted to ensure that the work surface 11 of the cabinet 10 is substantially level. While the at least one leveling means 20 may be adjustable in alternate embodiments, in its most preferred form, the at least one leveling means 20 is a single fixed section which extends between the left and right sides, 15 and 16, near the front of the cabinet 10.

The interior storage volume of the cabinet 10 is partitioned into at least two separate compartments, a front compartment 36 and a rear compartment 37 by a partition 35 which extends from the left side 15 to the right side 16 of the cabinet 10. The partition 35 should be securable to the bottom 12, right side 15 and left side 16, but should not attach to the work surface 11. Preferably the partition 35 does not extend the entire height of the cabinet 10, thereby creating a gap or space between the partition 35 and the work surface 11.

A substantially horizontal ledge 40 projects inwardly from inside surfaces of the interior storage volume. This ledge 40 also projects from both sides of the partition 35. The ledge 40 separates the interior storage volume into an upper space and a lower space. Thus, in this embodiment, there are four separate chambers: a lower rear chamber 47, an upper rear chamber 46, a lower front chamber 42, and an upper front chamber 41. It is apparent, by inspection of the figures, that contents contained in the lower chambers, 42 and 47, are accessible only though the upper compartments, 41 and 46.

A computer tray 25 which is removably attachable to the work surface 11 is further provided with the work station 1. The computer tray 25 is a flat surface with four retaining walls 26 which run along the edges of the computer tray 25. The retaining walls 26 help prevent a held computer or other objects from falling off of the computer tray 25. The computer tray 25 is further adapted to be received within the interior storage volume and is sized to be supported by the ledge 40 which separates the upper front compartment 41 from the lower front compartment 42. Moreover, a second tray 27 which is structurally similar to the computer tray 25 is provided and is adapted to be supported by the ledge 40 which separates the upper rear chamber 46 from the lower rear chamber 47. The second tray 26 is be used to hold pens, spare change and other small loose items. While the computer tray 25 is removably attachable by an suitable means, hook and loop fasteners, such as VELCRO, are preferred.

The work station 1 is secured to the seat 2 by a securing structure 50. The preferred securing structure 50 are comprised of a pair of male/female buckles 51, 52 and a securing strap 53. Each of two opposite ends of the securing strap 53 are attached to a male portion of each of the male/female buckles 51, 52, respectively. Each of the female portions of the male/female buckles 51, 52 are attached to the left side 15 and the right side 16 of the cabinet 10, respectively. The securing strap 53 is length adjustable attached and is adapted to be used with different sized motor vehicle seats 2.

Attached to an underside of the bifurcated work surface 11, preferably under the second lid 18, is at least one accessory holder(s) 55. The at least one accessory holder(s) 55 are used to hold cellular telephones, eye glasses, sun glasses or the like. However, the at least one accessory holder(s) 55 may be attached to an underside of the first lid 41. Likewise, if there are more than one accessory holder(s) 55, then, they may be on one or both of the first or second lids 17 and 18. In the preferred embodiment, the at least one accessory holder(s) 55 are detachably attached to the undersides such that they may be easily repositioned for easy access and use.

Attached to the back 14 of the cabinet 10 is an additional compartment 30 which is useful for holding clipboards and the like. The narrow enclosure 30, however, may be integrally formed and fully contained within the cabinet 10 of the work station 1.

A handle 65 is attached to the cabinet 10, preferably on the left side 15, to facilitate transportation of the work station. Moreover, the handle 65 is preferably of the type commonly used on briefcases and the like.

Furthermore, there is provided at least one electrical power plug(s) 70 in the front side 13 which provide power to a computer, printer or other accessories, such as a small desk lamp or the like. In order to provide the correct form of electrical power, there may by, enclosed by the cabinet 10, a power converter which is adapted to convert direct current electricity to alternating current electricity, 110 volt rms. The at least one power plug(s) 70 are adapted to be capable of electrical connection with a secured computer.

Figure 11:
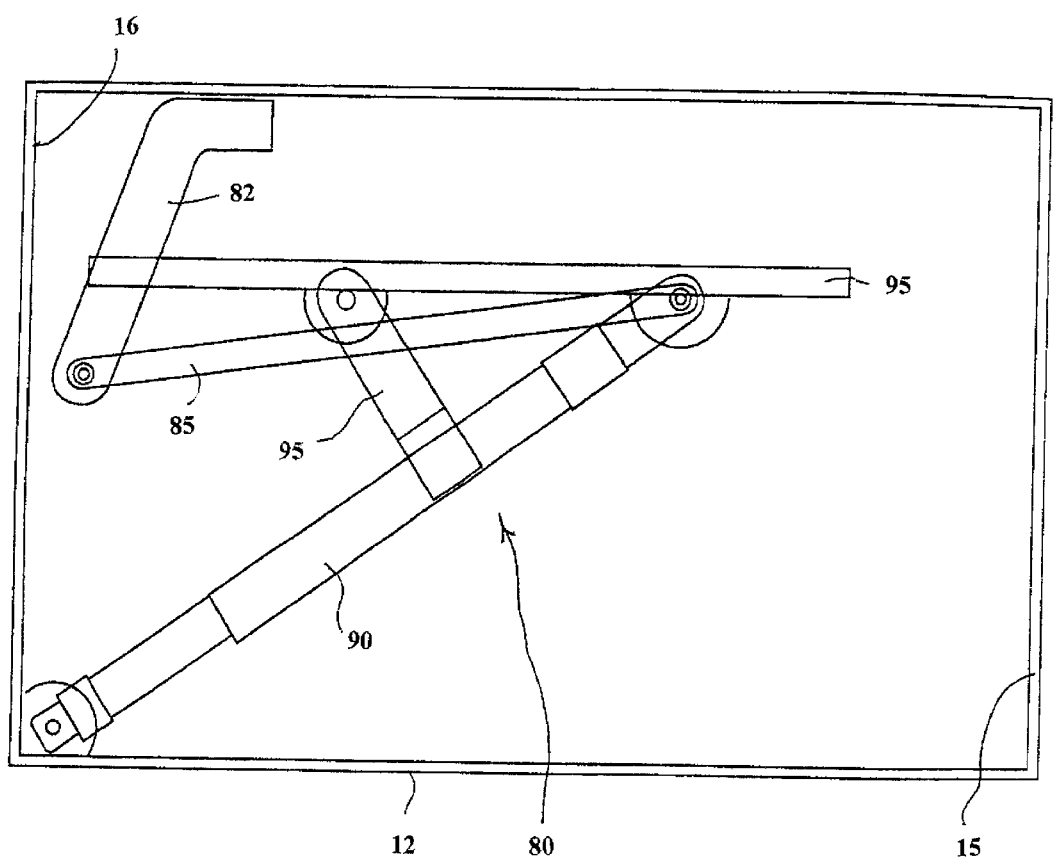
FIG. 11 is a side view of an alternate embodiment of the present invention, illustrating the lid and computer tray hardware with the lid in a closed position.
Figure 12:
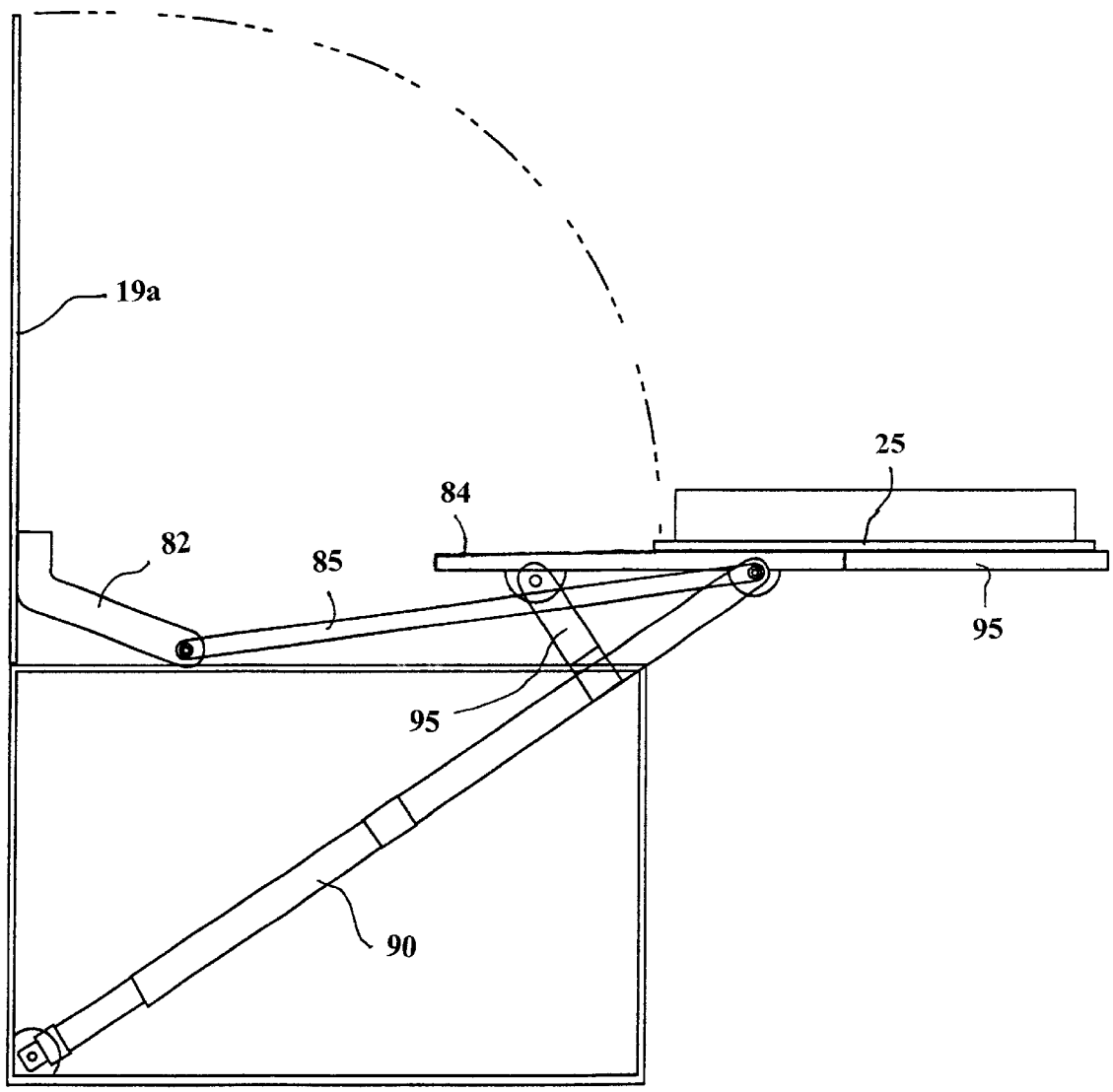
FIG. 12 is a side view of the alternate embodiment of the present invention, illustrating the lid and computer tray hardware with the lid in an open position.
Figure 13:
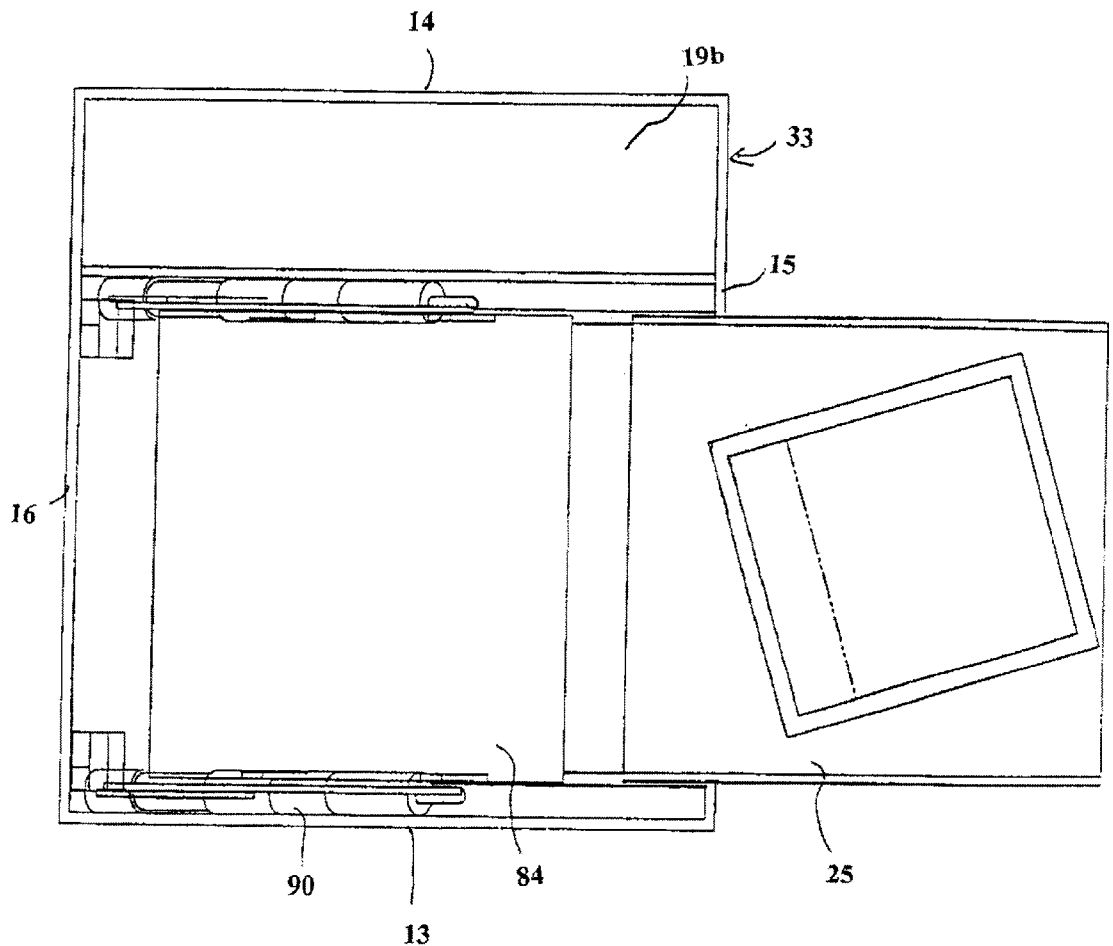
FIG. 13 is a top view of the alternate embodiment of the present invention with the lid open and the computer tray in an extended position.
Figure 14:
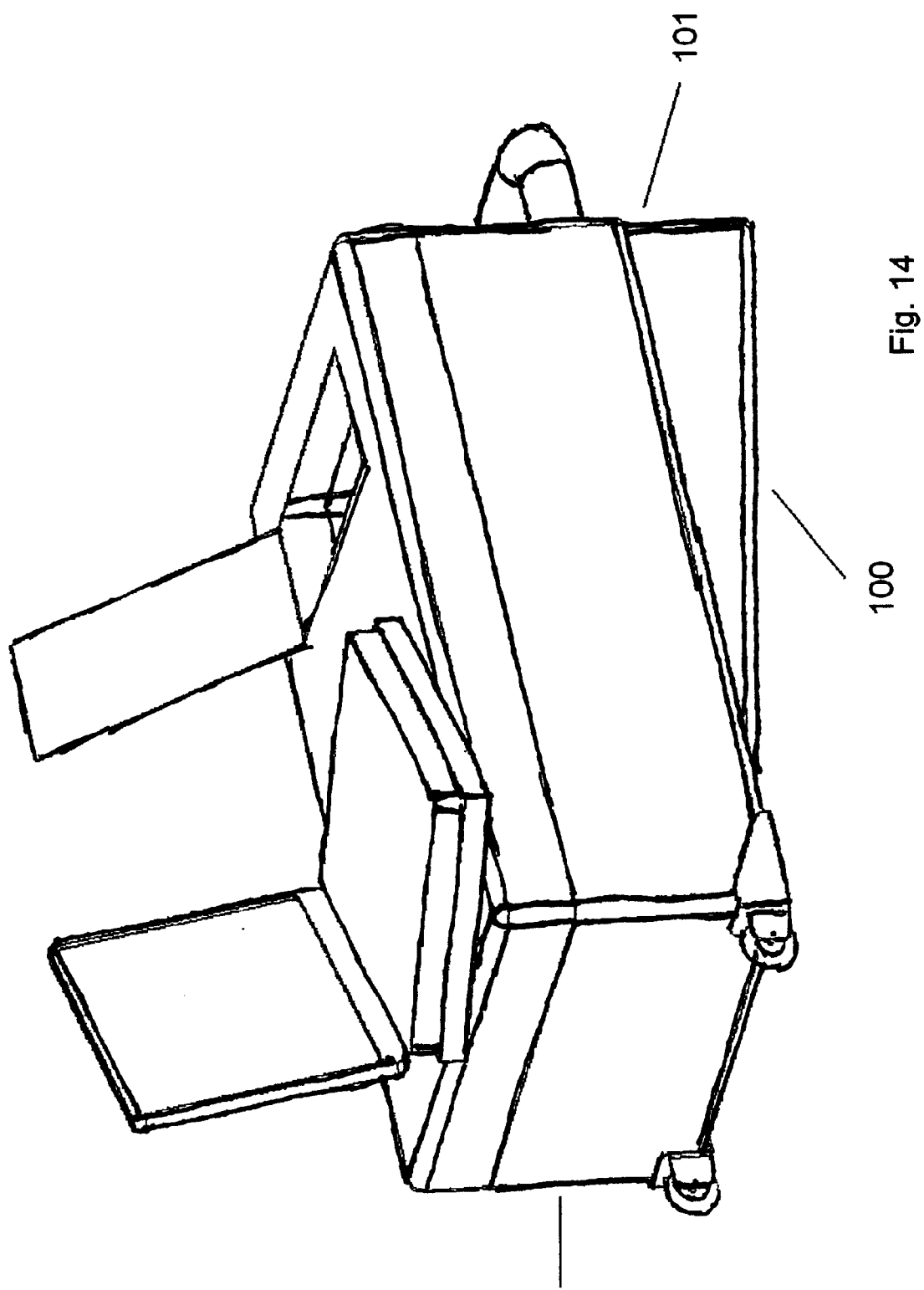
FIG. 14 is a perspective view of the present invention with an angularly adjustable feature that allows the cabinet to adjust to varying positions in a car seat.
Figure 15:
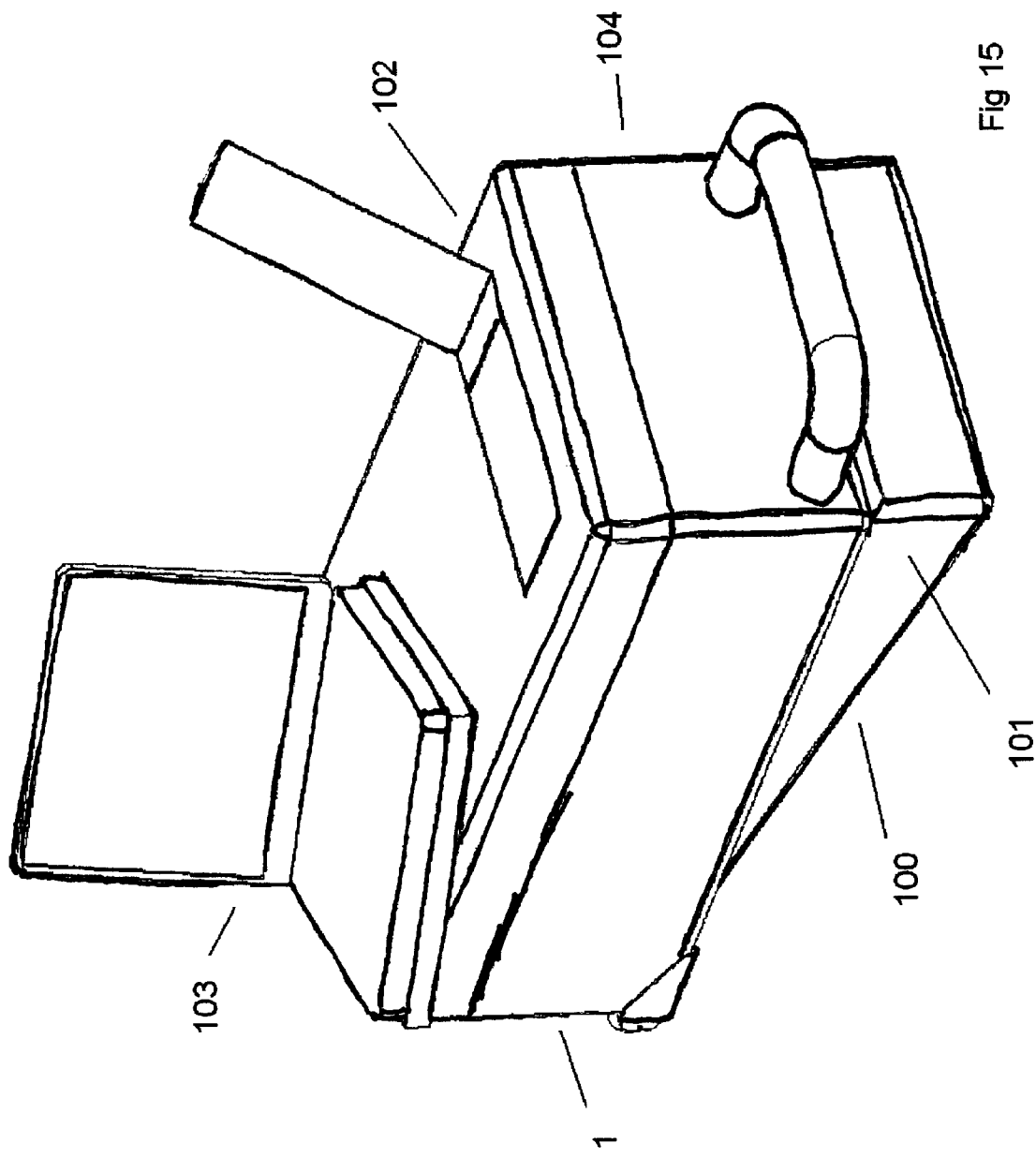
FIG. 15 is an additional perspective view of the present invention with the angularly adjustable feature.

In an alternate embodiment of the present invention, illustrated in FIGS. 11 through 13, the interior of the cabinet 10 remains a single compartment without the partition 35 or the ledge 40. Instead, there is an articulated cantilever arm system 80 to which the computer tray 25 is attached. As above, in this embodiment the work surface 11 is bifurcated, with a main lid section 19a pivotally attached to the right side 16 and covering the interior chamber storage volume. A minor lid section 19b covers a secondary storage chamber 33 which is located toward the back of the cabinet 10.

The articulated cantilever arm system 80 extends and presents the computer tray 25 and any secured computer when the main lid section 19a is opened. The articulated cantilever arm system 80 comprises two arm mechanism 81, each of which has a lid arm 82 which is affixed at a first end to the main lid section 19a. The lid arm 82 is attached at a second end to a first end of a pushing arm 85. A second end of each of the pushing arms 85 is further pivotally attached to opposite sides of a support tray 84. A hydraulic actuator 90 is pivotally attached at a first end 91 to the interior of the interior storage volume. A second end 92 of the hydraulic actuator 90 is pivotally attached to the support tray 84. A support arm 95 is attached pivotally to the support tray 84 at a first end and is affixed at a second end to a mid-portion of the hydraulic actuator 90.

In use, when the main lid section 19a is opened the lid arm 82 forces the pushing arm 85 outward. The extension of the pushing arm 84 activates the hydraulic actuator 90 causing it to force the support tray 84 upward and outward. Closing the main lid section 19a reverses the action of the cantilever arm system, thereby storing a secured computer within the interior storage volume.

The support tray 84 has a pair of bearing race tracks 95 which are attached to front and back edges of the computer tray 25. Thus, when the main lid section 19a is opened, and the support tray 84 and movably attached computer tray 25 are forced upward and outward, the computer tray 25 may then be further extended toward the left side of the motor vehicle, placing a secured computer into a more accessible position.

This second embodiment is considered to have safety advantages not found in prior art devices. First, a secured computer is automatically stored within the interior storage volume of the work station 1, thus, if the motor vehicle makes sudden turns or stops, the computer, a heavy device, remains in place and does not travel about the interior of the motor vehicle cabin. Second, the automatic storage of a secured computer hides the computer when the user is not in the vehicle, thereby helping to prevent theft of the computer.

An alternate embodiment of the work station 1 also includes a feature that allows for the adjustment of the work station to enable a user to adjust the work station 1 so that the top surface 102 may allow the computer 103 to rest on the top surface 102 of the work station parallel to the floor of an automobile. The feature includes a flat base 100 that is substantially perpendicular to a vertical portion 101 such that the vertical portion may either be slideably engaged with the front portion of the cabinet 104, or may be of a fixed size such that the front portion of the cabinet 104 may rest on top of the vertical portion 101. It is desirable to place the work station 1 in the passenger seat of the car such that front portion of the cabinet 104 will rest toward the back rest of the passenger seat such that the adjustable feature will allow a user of the computer 103 to use the computer 103 on a substantially flat surface, as opposed to an incline due to the nature of most declining features of the seat portions of most passenger seats.

While these descriptions directly describe the above embodiments, it is understood that those skilled in the art may conceive modifications and/or variations to the specific embodiments shown and described herein. Any such modifications or variations which fall within the purview of this description are intended to be included therein as well. It is understood that the description herein in intended to be illustrative only and is not intended to be limitative. Rather, the scope of the invention described herein is limited only by the claims appended hereto.

What is claimed is:

1. A portable work station for use in a motor vehicle comprising:
    a) a cabinet which has an interior chamber and a pivotally attached work surface which covers the interior chamber, said cabinet further having a securing structure which is adapted to secure the cabinet to a motor vehicle seat, said cabinet further having a secondary storage compartment located at a back section of the cabinet, said cabinet further having;
        i) a bottom portion,
        ii) a base having a front end and a back end, said back end being fixed to the bottom portion of the cabinet, said front end further comprising an adjustable portion, said adjustable portion being substantially perpendicular to said base,
        iii) said cabinet having a front section, said adjustable portion being slideably engaged with said front section of said cabinet such that the angle of the cabinet with respect to the base may be adjustable; and
    b) a cantilever arm system attached to the interior chamber and is further attached to a support tray, said cantilever arm system further having a pair of arm mechanisms, one for each of a front and back side of the support tray, said cantilever arm systems further having a lid arm which is attached at a first end to a bottom surface of the work surface and pivotally attached at a second end to a first end of a push arm, a second end of the push arm being pivotally attached to the support tray, a hydraulic arm which is pivotally attached at a first end to the interior chamber and pivotally attached at a second end to the support tray, and a support arm which is pivotally attached to the support tray and extends and attaches to a mid-portion of the hydraulic arm; and
    c) a computer tray which is attached to the support tray by a pair of bearing race tracks,
whereby when the work surface taken from a closed position to an open position, the support tray is force upward and outward by the cantilever arm system, and the computer tray is extendible outward by the pair of bearing race tracks.

2. The portable work station of claim 1 in combination with a portable computer.

3. The portable work station of claim 2 wherein said portable computer may rest on the cabinet and be secured to said cabinet with Velcro material.

* * * * *